(12) United States Patent
Bodenstein

(10) Patent No.: US 10,481,694 B2
(45) Date of Patent: Nov. 19, 2019

(54) TOUCH-SENSITIVE INPUT DEVICE WITH ELECTROMAGNETIC ACTUATOR OPERATED AT MAXIMUM MAGNETIZATION

(71) Applicant: PREH GMBH, Bad Neustadt A.D. Saale (DE)

(72) Inventor: Tobias Bodenstein, Salz (DE)

(73) Assignee: PREH GMBH, Bad Neustadt A.D. Saale (DE)

( * ) Notice: Subject to any disclaimer, the term of this patent is extended or adjusted under 35 U.S.C. 154(b) by 0 days.

(21) Appl. No.: 16/008,043

(22) Filed: Jun. 14, 2018

(65) Prior Publication Data

US 2019/0310708 A1  Oct. 10, 2019

(30) Foreign Application Priority Data

Apr. 9, 2018  (DE) .................... 20 2018 101 900 U

(51) Int. Cl.
*G06F 3/044*  (2006.01)
*G06F 3/01*  (2006.01)
(Continued)

(52) U.S. Cl.
CPC .............. *G06F 3/016* (2013.01); *B60Q 9/00* (2013.01); *G06F 3/0414* (2013.01); *H01F 7/064* (2013.01);
(Continued)

(58) Field of Classification Search
CPC .................. G06F 3/016; G06F 3/0414; G06F 2203/04105; G06F 3/03547; G06F 3/044;
(Continued)

(56) References Cited

U.S. PATENT DOCUMENTS

| 2008/0280640 | A1* | 11/2008 | Wedel | G06F 3/0338 455/556.1 |
| 2011/0037546 | A1* | 2/2011 | Marie | G06F 3/016 335/230 |
| 2012/0242464 | A1* | 9/2012 | Maier | G06F 3/016 340/407.2 |

FOREIGN PATENT DOCUMENTS

DE   10 2017 107 366 A1   1/2018

OTHER PUBLICATIONS

T. A. Kern: „Entwicklung Haptischer Geräte Ein Einstieg für Ingenieure, Springer Verlag, pp. 208-253, (2009), English Translation of the relevant pages.
(Continued)

*Primary Examiner* — Lunyi Lao
*Assistant Examiner* — Jarurat Suteerawongsa
(74) *Attorney, Agent, or Firm* — Norman B. Thot

(57) ABSTRACT

A touch-sensitive input device includes a support, an input part with a touch-sensitive input surface, an elastic device which bears the input part at the support, an electromagnetic actuator which acts between the input part and the support to produce a deflection of the input part out of a resting position, and control electronics. The electromagnetic actuator comprises a coil with a cavity, a core arranged at least in part in the cavity, and an armature arranged outside the cavity. The core generates a magnetic field defining a pole direction. The armature interacts with the magnetic field. The control electronics generate an electrical control signal for the coil to produce the deflection of the input part out of the resting position and to provide a maximum deflection of the input part. A duration of the electrical control signal is limited so as to provide, after the deflection, a haptic feedback.

20 Claims, 3 Drawing Sheets

(51) Int. Cl.
　　　*G06F 3/041*　　　(2006.01)
　　　*B60Q 9/00*　　　(2006.01)
　　　*H01F 7/08*　　　(2006.01)
　　　*H01F 7/06*　　　(2006.01)
　　　*H01F 27/245*　　　(2006.01)
　　　*H01F 7/126*　　　(2006.01)
　　　*H01F 27/28*　　　(2006.01)
　　　*G06F 3/0354*　　　(2013.01)

(52) U.S. Cl.
　　　CPC ............. *H01F 7/081* (2013.01); *H01F 7/126* (2013.01); *H01F 27/245* (2013.01); *H01F 27/28* (2013.01); *G06F 3/03547* (2013.01); *G06F 3/044* (2013.01); *G06F 2203/04105* (2013.01)

(58) Field of Classification Search
　　　CPC ........ H01F 27/28; H01F 7/126; H01F 27/245; H01F 7/064; H01F 7/081; B60Q 9/00
　　　See application file for complete search history.

(56) References Cited

OTHER PUBLICATIONS

International Standard CEI IEC 60404-14: "Magnetic materials—Part 14: Methods of measurement of the magnetic dipole moment of a ferromagnetic material specimen by the withdrawal or rotation method", First edition (2002).

\* cited by examiner

TOUCH-SENSITIVE INPUT DEVICE WITH ELECTROMAGNETIC ACTUATOR OPERATED AT MAXIMUM MAGNETIZATION

CROSS REFERENCE TO PRIOR APPLICATIONS

Priority is claimed to German Patent Application No. DE 20 2018 101 900.7, filed Apr. 9, 2018. The entire disclosure of said application is incorporated by reference herein.

FIELD

The present invention relates to a touch-sensitive input device which has a support and a touch-sensitive input part, such as a touchpad or a touchscreen, in particular a touchscreen having an electronic pixel matrix display, that is borne on the support so as to be movable in an elastically resetting manner by an elastic device along at least one deflection direction. A display is, for example, a liquid crystal design or in the style of an OLED. The touchpad or the touchscreen can, for example, have a capacitive electrode sensor package for touch detection with spatial resolution. In an embodiment, a force sensor is also or is alternatively provided for measuring an actuation involving contact, as a contact under application of an actuation force acting on the touch-sensitive display. At least one actuating element having an actuator is also provided that drives the input part along the deflection direction to generate a haptic feedback in the form of a deflection or vibration excitation of the input part in case of a contact and/or an actuation that has occurred, for example, at the latest upon exceeding a predetermined actuation force measured by the force sensor, in order to ultimately provide a feedback to the operator that a contact and/or actuation has been detected, and that a switching process or control process is associated, if applicable.

BACKGROUND

In typical input devices, electromagnetic actuators are used that typically have a coil attached at the support side and an armature at the input part side, whereby the armature interacts with the magnetic field generated by the coil. Upon installation and in operation, the problem arises that the electromagnetic force on the armature that is generated by current flowing through the coil varies starkly with the distance between armature and coil, or the core that is at least partially accommodated in the coil. This is problematic since, in operation, the retention and the perpetual return to a defined resting position, which is defined by a predetermined air gap between armature and core, cannot be ensured. This is in part due to the elastic means/device whose elasticity varies in the course of the operating duration, but which is also subject to stronger variation with the fluctuations of the ambient conditions, such as temperature and the like, in particular if the elastic means/device is manufactured as parts stamped from a spring steel to save installation space.

SUMMARY

An aspect of the present invention is to provide a generic input device that poses less of a requirement on the adjustment precision of the actuating element, and which makes a readjustment in operation unnecessary, even under fluctuating ambient conditions. An aspect of the present invention is therefore to provide an input device with haptic feedback via actuator movement excitation in which the adjustment requirement is reduced and, in particular, where a readjustment during the usage duration for the purpose of a consistent actuation by the actuating element is unnecessary.

In an embodiment, the present invention provides a touch-sensitive input device which includes a support, an input part comprising a touch-sensitive input surface, an elastic device configured to bear the input part at the support along a deflection direction so that the input device is elastically reset and is oscillatively movable, an electromagnetic actuator configured to act between the input part and the support so as to produce a deflection of the input part out of a resting position, and control electronics. The deflection of the electromagnetic actuator comprises at least one effective direction having an effective direction component that is parallel to the deflection direction. The electromagnetic actuator comprises a coil which is configured to define a cavity, a ferromagnetic core which is arranged at least in a region in the cavity, and a ferromagnetic armature arranged outside the cavity. The ferromagnetic core is configured to generate a magnetic field defining a pole direction. The ferromagnetic armature is configured to interact with the magnetic field. The control electronics are configured to generate an electrical control signal for the coil of the electromagnetic actuator so that the coil of the electromagnetic actuator, after a detection of a contact of the input part and/or after a detection of an actuation of the input part by an actuation force sensor, is charged with the electrical control signal so as to produce the deflection of the input part out of the resting position and to provide a maximum deflection of the input part. A duration of the electrical control signal is limited so as to provide, after the deflection, a return of the input part to the resting position or an oscillation of the input part around the resting position along the deflection direction, thereby respectively generating a haptic feedback. The electrical control signal and the ferromagnetic armature are selected so that, along an imaginary line passing through the ferromagnetic armature in the pole direction, a maximum deflection along a curve of a line is achieved at the latest when a maximum magnetization of the ferromagnetic armature is achieved. The maximum magnetization is at least 90% of a material-specific saturation magnetization.

BRIEF DESCRIPTION OF THE DRAWINGS

The present invention is described in greater detail below on the basis of embodiments and of the drawings in which.

DETAILED DESCRIPTION

Figure 1:
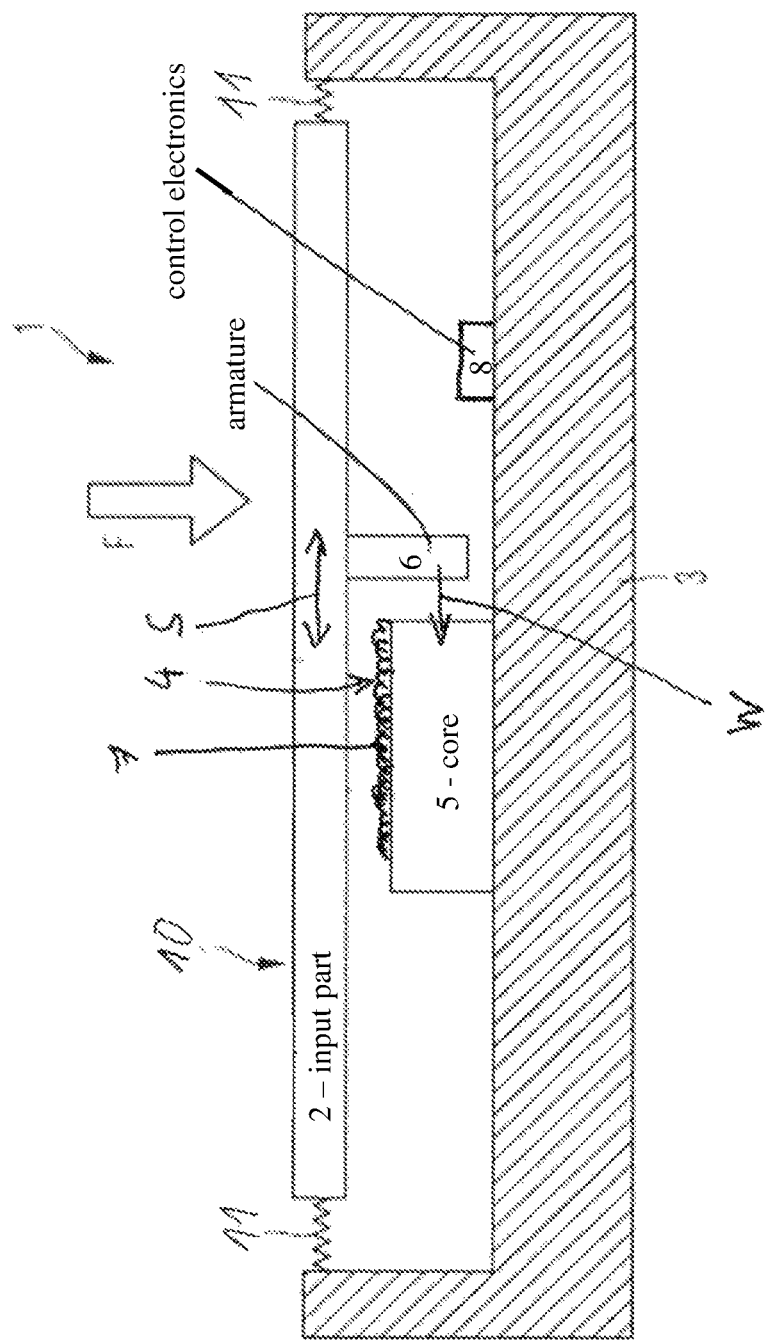
FIG. 1 shows a sectional depiction of an embodiment of the input device according to the present invention.

The input device according to the present invention has a support. The term, "support" is thereby to be construed broadly and generally serves for the fixing and holding function of the input device, for example, at an inner casing, a center console, or at an instrument panel of a motor vehicle. The support is made from a plastic, for example, from a thermoplastic.

The present invention also provides a touch-sensitive input part. The term "input part with touch-sensitive input surface" is likewise to be construed broadly. It is thereby generally an input device that defines an input surface facing toward the operator, at which input surface at least one contact by an input organ or a finger of an operator is detected by a sensor element, for example, is detected with spatial resolution. The touch-sensitive input part can, for example, be a touchpad, i.e., a displayless input part with spatially resolving detection of a contact on an input surface belonging to the input part, or a touchscreen, i.e., an input part with spatially resolving detection of a contact on an input surface belonging to the input part, wherein, in the latter instance, an electronic display, in particular, an electronic pixel matrix display, is also associated with the input surface. In an embodiment of the present invention, a device for detecting an actuation may also be provided. An action of an actuating force applied by an actuating organ to the input surface is understood as an actuation.

One or more sensors for detecting a contact and/or an actuation force on the input surface are, for example, associated with the input surface. It involves, for example, multiple electrodes arranged in a matrix and an associated evaluation unit for spatially resolved contact detection, and/or one or more force sensors for detection of the pressure force produced by the actuation, such as one or more capacitive, inductive, or optical force sensors.

The present invention also provides an elastic means/device via which the input part is borne so as to be movable on a support so as to be able to elastically return and move in oscillation, at least along one deflection direction. The elastic means/device thus serves for the bearing and the elastic return of the input part to a resting position. The elastic means/device can, for example, be provided as plates of a spring steel.

The present invention also provides an electromagnetic actuator that is arranged to be acting, for example, attracting, between the input part and the support. The electromagnetic actuator is provided to produce a deflection of the input part out of an associated resting position. The actuator thereby has at least one direction of action, with a component of the direction of action that is parallel to the deflection direction. According to the present invention, the deflection is provided to allow a subsequent return of the input part to the resting position, or an oscillation to generate a haptic feedback along the deflection direction around the resting position, wherein the movement of the input part causes a haptic feedback to the operator due to its present touch contact with the contact organ of the operator.

The present invention provides an electromagnetic actuator with a coil formed from an electrical conductor, which coil defines a cavity in which is arranged, at least in part, a core made from ferromagnetic material, for example, a soft magnetic material. This can, for example, be a machining steel, a soft iron, a dynamo sheet, a ferrite, or a silicon-containing, ferrite sintering materials. Coil and core generate a magnetic field for interaction with an armature belonging to the actuator, the armature being formed from ferromagnetic material and being arranged outside of the cavity, which armature is normally designated as a lifting armature. The magnetic field within the cavity defined by the coil thereby defines, via its main field direction that is there present, a polar alignment that is referred to, for short, as a pole direction.

The present invention provides the actuator for producing a deflection of the input part, for example, of the touch-sensitive display, for generating a haptic feedback along the deflection direction. The actuator is arranged to act between the input part and the support, i.e., it is supported by the support and acts on the input part in order to produce a movement of the input part for generating a haptic feedback. The magnetic field-generating and magnetic field-directing means of the actuator, i.e., the coil and the core, can, for example, be fixed at the support, whereas the associated armature of the actuator is fixed at the input part.

The present invention provides control electronics to generate an electrical coil signal for the coil of the actuator so that, after detection of a contact of the input part and/or detection of an actuation of the input part by an actuation force sensor, the coil of the electromagnetic actuator is charged with a control signal in order to bring about the deflection of the input part from the resting position and achieve a maximum deflection. The control signal is thereby limited in its duration so that, after the deflection into the maximum deflection, for example, immediately after reaching the maximum deflection, a return to the resting position or, if applicable, an oscillation of the input part around the resting position is allowed along the deflection direction for generating a haptic feedback. An ending of the control signal does not necessarily need to be inferred by the limited duration; rather, only the ending of the magnetic interaction of the control signal that produces the deflection should be inferred. The control signal and the armature (for example, due to its arrangement relative to the core and/or its embodiment) are respectively selected so that, along an imaginary line drawn through the armature in the pole direction, at least one maximum magnetization of the armature is reached, at the latest, upon the first achievement of the maximum deflection, for example, beforehand, along the curve of the line, wherein the maximum magnetization is defined by a value that is at least 90% of a material-specific saturation magnetization, in particular, at an ambient temperature of 20° C., for example, at least 95% of a material-specific saturation magnetization, in particular at an ambient temperature of 20° C.

Given ferromagnetic substances, the saturation magnetization is a material-specific maximum value of the magnetization that cannot be exceeded, even by increasing the external magnetic field strength H, and that is approached asymptotically. A maximum magnetization according to the present invention is referred to if an approximation by more than 90% to the value of the material-specific saturation magnetization is achieved, for example, an approximation by more than 95% to the value of the material-specific saturation magnetization. Deriving the magnetization with respect to the field strength, the differential magnetic susceptibility disappears upon reaching the saturation magnetization. The saturation magnetization can, for example, be determined according to DIN EN 60404-14:2003-02 at an ambient temperature of 20° C.

It has been shown that, although the maximum magnetic force effect on the armature is limited for such an overrun of the maximum magnetization in the armature according to the present invention, a distinctly lower dependency of the magnetic force on the dimension of the deflection, and therefore on the clearance defined by the air gap between armature and core, is achieved therefor, in particular in the resting position. This distinctly lower dependency of the force curve on the deflection or on the relative arrangement of armature and core in the resting position has the advantage that the haptic excitation reacts less sensitively to variations of the resting position that, for example, result from aging of the elastic means/device or temperature-dependent variations of the elastic means/device. The requirements for a precise positioning in the initial installation are thereby also reduced.

In an embodiment, the present invention provides that maximum magnetization be present, for example, at least, at the latest, at the point in time of the first achievement of the maximum deflection in more than 20% of a total volume of the armature, which is determined by its outer dimensions.

In an embodiment, the present invention provides that the duration of the control signal should not, for example, exceed 5 ms, for example, 2 ms. The duration is thereby defined by the time interval between the latest detection event made up of detection of the contact or detection of the actuation and a decay point in time at which the control signal essentially reaches zero.

In an embodiment of the present invention, at least one maximum magnetization of the armature can, for example, be achieved in a time interval between the first achievement of the half deflection and the first achievement of the maximum deflection along the curve of the line.

The control signal can, for example, begenerated via pulse width modulation.

In an embodiment of the present invention, the core can, for example, be formed in an E-shape, i.e., it has a section plane that has the shape of an E. The coil can, for example, be wound around the middle of the three arms of the E-shaped core.

To minimize the induced eddy currents in the material of the core that interfere with the magnetic field propagation in the core, the core can, for example, be constructed from multiple layers arranged in a stack. Its stack direction can, for example, be orthogonal to the pole direction.

In an embodiment of the present invention, each layer can, for example have an identical layer thickness. Layer thickness is thereby understood to be the dimension of the layer in the stack direction. The dimension of the armature in the pole direction can, for example, be less than two to five times the layer thickness.

In an embodiment of the input device according to the present invention, the air gap formed between armature and core can, for example, have a clearance in a range of 0.7 to 1.3 mm between armature and core in the resting position. The armature is made of a solid material to achieve an early saturation state along the line described above.

In an embodiment of the present invention, the armature can, for example, be made from a material which achieves the maximum magnetization with comparably low magnetic flux density. Steel or ferrite can, for example, be used. The armature can, for example, have a rectangular shape. In an embodiment of the present invention, the armature can, for example, be attached to the input part by way of a fixing element, while the fixing element and the armature are fixed together by way of form-fit, force locking and/or a material bonding.

In an embodiment of the present invention, the armature can, for example, be attached to the input part, and the input part can, for example, be made from non-magnetic, i.e., non-ferromagnetic, materials in the region adjoining the armature.

The deflection direction can, for example, be essentially parallel to the touch-sensitive input surface defined by the input part.

The dimensions of the armature in the pole direction can, for example, be less than 1/10 of the dimensions of the core in the pole direction.

The dimensions of the anchor in the pole direction can, for example, be in a range of 0.9 to 1.1 mm.

In an embodiment of the present invention, the dimensions of the armature in the pole direction can, for example, be smaller than the clearance defined by the air gap.

The present invention also relates to the use of the touch-sensitive input device in one of the embodiments described above in a motor vehicle, in particular, in a center console of a motor vehicle.

The present invention also relates to a method for controlling a touch-sensitive input device in one of the embodiments described above. In a preparation step, the touch-sensitive input device is provided in one of the embodiments described above and has at least one support and an input part having a touch-sensitive input surface, such as a touchpad or a touchscreen. According to the present invention, the input part is borne on the support by an elastic means/device so as to be able to elastically reset and move in oscillation. The provided input device has an electromagnetic actuator acting between the input part and the support so as to produce the deflection of the input part out of an associated resting position. The actuator thereby has an effective direction that has an effective direction component parallel to the deflection direction.

The present invention also provides control electronics for generating an electrical control signal for the actuator. In a current feed step, after detection of a contact of the input part and/or detection of an actuation of the input part has taken place via an actuation force sensor, the coil of the electromagnetic actuator is fed with the control signal in order to produce the deflection of the input part out of the resting position and to achieve a maximum deflection. The duration of the control signal is thereby limited in order to allow a return of the input part to the resting position or an oscillation of the input part around the resting position along the deflection direction so as to, respectively, generate a haptic feedback after the deflection, for example, immediately after achievement of the maximum deflection. The control signal and the armature (for example, due to its arrangement relative to the core and/or embodiment) are thereby respectively selected so that, along an imaginary line drawn through the armature in the pole direction, at least one maximum magnetization of the armature is reached, at the latest, upon the first achievement of the maximum deflection along the curve of the line, wherein the maximum magnetization is defined by a value that is at least 90% of a material-specific saturation magnetization, for example, at least 95% of a material-specific saturation magnetization.

For ferromagnetic substances, the saturation magnetization is a material-specific maximum value of the magnetization that cannot be executed even by increasing the external magnetic field strength H, and which is approached asymptotically. A maximum magnetization is referred to herein if an approximation by more than 90% to the value of the material-specific saturation magnetization is achieved, for example, an approximation by more than 95% to the value of the material-specific saturation magnetization. Deriving the magnetization with respect to the field strength, the differential magnetic susceptibility disappears upon reaching the saturation magnetization. The saturation magnetization can, for example, be determined according to DIN EN 60404-14:2003-02 at room temperature.

It has been shown that, although the maximum magnetic force effect on the armature is limited with such a maximum magnetization in the armature according to the present invention, a distinctly lower dependency of the magnetic force on the dimension of the deflection, and therefore on the clearance defined by the air gap between armature and core, is achieved therefor, in particular in the resting position. This distinctly lower dependency of the force curve on the deflection or on the relative arrangement of armature and core in the resting position has the advantage that the haptic excitation reacts less sensitively to variations of the resting position that, for example, result from an aging of the elastic means/device or temperature-dependent variations of the elastic means/device. The requirements for a precise positioning in the initial installation are thereby also less.

The present invention, as well as the technical setting, will be further explained below under reference to the drawings. It is thereby noted that the present invention is not limited to the embodiment shown in the drawings.

FIG. 1 shows an embodiment according to the present invention of the input device 1. The input device 1 has a support 3 that serves for the attachment of the input device 1 at a center console (not shown) or an instrument panel (not shown) of a motor vehicle. An input part 2 is borne at the support 3 by the elastic means/device 11 so as to be able to elastically reset and move in oscillation. As depicted, the elastic means/device 11 are spiral springs made, for example, of a spring steel. According to an alternative embodiment, leaf springs that are produced as parts stamped from spring steel can be provided as the elastic means/device 11. The input part 2 can, for example, be a touchpad with a touch-sensitive input surface 10 facing towards the operator. As an alternative to the touchpad, a touchscreen may be provided, i.e., a combination of an electronic pixel matrix display with a touch sensor element. The input part 2 detects the contact of an operating organ, e.g., the finger of an operator, on the input surface 10 defined by the input part 2.

An electromagnetic actuator 4 that has a coil 7 and a core 5 made of a ferromagnetic material, for example, a soft magnetic material, both of which are fixed on the support 3, is arranged between the support 3 and the input part 2.

The coil 7 defining a cavity is fed with a control signal by control electronics 8. The coil 7 fed with the control signal generates a magnetic field inside and outside of the cavity, wherein the portion of the magnetic field situated within the cavity defines a pole direction P. The magnetic field generated in such a manner interacts with an armature 6 made of ferromagnetic material that is situated outside of the cavity and which belongs to the electromagnetic actuator 4, the armature 6 being attached to the input part 3 so that the armature 6 is attracted, and the input part 2 is deflected out of the resting position. For example, the input part 2 has a holder made of non-ferromagnetic plastic, such as a thermoplastic, adjoining which is arranged the armature 6, e.g., via extrusion coating.

Figure 2:
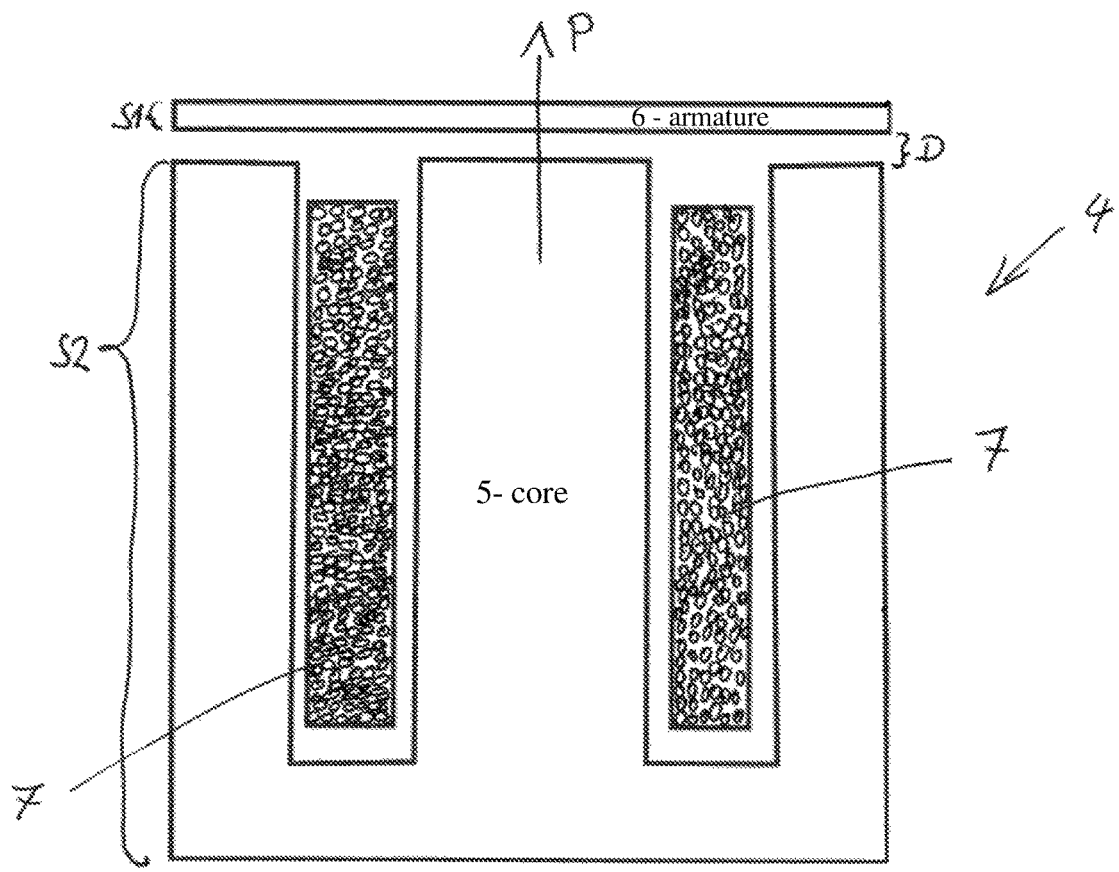
FIG. 2 shows a sectional view of the actuator of the embodiment from FIG. 1.
Figure 3:
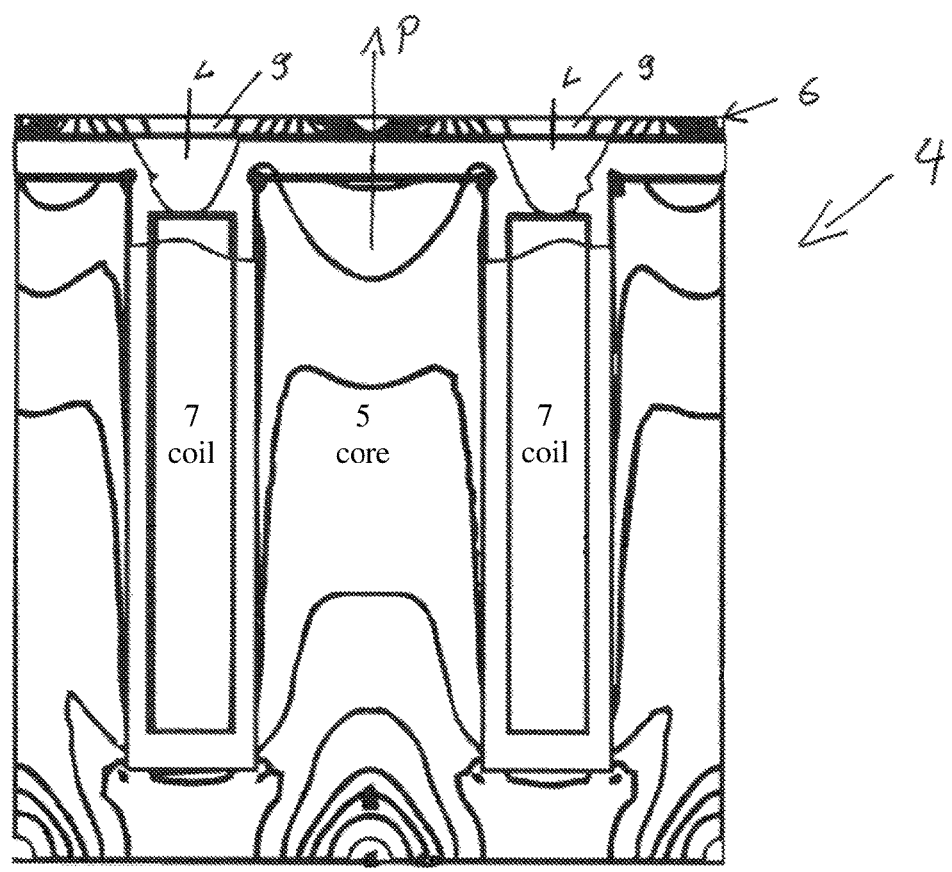
FIG. 3 shows an additional visualization of the magnetic field propagation in the core and in the armature.

In FIG. 1, the effective direction of the electromagnetic actuator 4 is designated by W. As is indicated by the double arrow S, the electromagnetically produced deflection of the input part 2 out of the resting position serves for the deflection and a subsequent oscillation in the deflection direction S around the resting position, which is haptically perceptible, such that a haptic feedback on the part of the operator is caused by a finger contacting the input surface 10. FIG. 2 shows, in a sectional view, the electromagnetic actuator 4, i.e., the armature 6, the coil 7, and the core 5, wherein the shown relative arrangement of armature 6 and core 5 corresponds to the resting position of the input part 2 in which the armature 6 and the core 5 are arranged separated from one another by an air gap defining the clearance D. The dimension S1 of the armature 6 in the pole direction P is less than 1/10 of the dimension S2 of the core 5 in the same direction. The armature 6 is made of solid ferromagnetic material, whereas the core 5 is constructed from stacked E-shaped plates of a soft magnetic material in order to reduce the induction of eddy currents. The stack direction of the plates of soft magnetic material that, in their entirety, form the core 5 is orthogonal to the pole direction P and orthogonal to the plane of the drawing. The coil 7 defines a cavity in which one of the three projections of the E-shaped core 5 is arranged so as to pierce it. The control signal triggered by a contact or actuation is limited in its duration in order to allow a return of the input part 2 to its resting position, or an oscillation of the input part 2 around the resting position, immediately after achievement of the maximum deflection. The entirety of the movement of the input part 2 serves to generate a haptic feedback. The embodiment of the armature 6 whose arrangement relative to the core 5 and the control signal is chosen so that a magnetic field has formed, at the latest, upon the first achievement of a maximum deflection, for example, beforehand, as is shown by way of example in FIG. 3 in a superimposed presentation with the actuator 4. In FIG. 3, the curved lines, and not the lines associated with the components of the actuator 4, that are of the same line height indicate the curve of equal field strength, wherein a region in which the material of the armature achieved a maximum magnetization or is magnetized to exceed this, said region passing through the armature 6 in the pole direction P, respectively forms in the regions designated with 9 in the armature 6. In its extent in the pole direction P, this region 9 is characterized by the imaginary lines L parallel to the pole direction P, along which lines L at least the maximum magnetization in the sense of the present invention is present. According to the present invention, a maximum magnetization is referred to if an approximation by more than 90% to the value of the material-specific saturation magnetization is achieved, for example, an approximation by more than 95% to the value of the material-specific saturation magnetization, in particular, respectively, determined at an ambient temperature of 20° C.

Given the ferromagnetic material used in the armature 6, the saturation magnetization is a material-specific maximum value of the magnetization that cannot be exceeded, even by increasing the external magnetic field strength H. It has been shown that, although a theoretically possible maximum magnetic force effect on the armature 6 is not produced by the magnetic field generated by the coil 7 fed with current, given such a maximum magnetization according to the present invention in the armature 6, a distinctly lower dependency of the magnetic force on the dimension of the deflection, and therefore on the present clearance defined by the air gap between armature and core, is achieved therefor. Expressed differently, in the instance characterized by the line L, the magnetic force development varies less due to deviation of the resting position alignment of armature 6 and core 5. This distinctly lower dependency of the force curve on the relative arrangement of core 5 and armature 6 in the resting position has the advantage that the haptic excitation reacts less sensitively to variations of the resting position that, for example, result from aging of the elastic means/device or temperature-dependent variations thereof. The requirements for a precise positioning in the initial installation of the input device 1 are thereby also less.

It is noted that the features and measures that are individually listed above may be combined in any technologically sensible manner and illustrate further embodiments of the present invention. The description characterizes and specifies the present invention, in particular in conjunction with the drawings. Reference should also be had to the appended claims.

What is claimed is:

1. A touch-sensitive input device comprising:
a support;
an input part comprising a touch-sensitive input surface;
an elastic device configured to bear the input part at the support along a deflection direction so that the input device is elastically reset and is oscillatively movable;
an electromagnetic actuator configured to act between the input part and the support so as to produce a deflection of the input part out of a resting position, the deflection comprising at least one effective direction having an effective direction component that is parallel to the deflection direction, the electromagnetic actuator comprising,
a coil which is configured to define a cavity,
a ferromagnetic core which is arranged at least in a region in the cavity, the ferromagnetic core being configured to generate a magnetic field defining a pole direction, and
a ferromagnetic armature which is configured to interact with the magnetic field and which is arranged outside the cavity; and
control electronics configured to generate an electrical control signal for the coil of the electromagnetic actuator so that the coil of the electromagnetic actuator, after a detection of a contact of the input part and/or after a detection of an actuation of the input part by an actuation force sensor, is charged with the electrical control signal so as to produce the deflection of the input part out of the resting position and to provide a maximum deflection of the input part,
wherein,
a duration of the electrical control signal is limited so as to provide, after the deflection, a return of the input part to the resting position or an oscillation of the input part around the resting position along the deflection direction, thereby respectively generating a haptic feedback;
the electrical control signal and the ferromagnetic armature are selected so that, along an imaginary line passing through the ferromagnetic armature in the pole direction, a maximum deflection along a curve of a line is achieved at the latest when a maximum magnetization of the ferromagnetic armature is achieved, and
the maximum magnetization is at least 90% of a material-specific saturation magnetization.

2. The touch-sensitive input device as recited in claim 1, wherein the input part is a touchpad or a touchscreen.

3. The touch-sensitive input device as recited in claim 1, wherein the maximum magnetization is present in >20% of a total volume of the ferromagnetic armature.

4. The touch-sensitive input device as recited in claim 1, wherein the duration of the electrical control signal does not exceed 5 ms.

5. The touch-sensitive input device as recited in claim 1, wherein the maximum magnetization of the ferromagnetic armature is achieved in a time interval between first achieving half of the maximum deflection along the curve of the line and between first achieving the maximum deflection along the curve of the line.

6. The touch-sensitive input device as recited in claim 1, wherein the ferromagnetic core is formed with an E-shape.

7. The touch-sensitive input device as recited in claim 1, wherein the ferromagnetic core comprises multiple layers arranged in a stack.

8. The touch-sensitive input device as recited in claim 1, wherein,
an air gap is formed between ferromagnetic armature and the ferromagnetic core, and
the air gap comprises a clearance of from 0.7 mm to 1.3 mm between the ferromagnetic armature and the ferromagnetic core in the resting position of the input part.

9. The touch-sensitive input device as recited in claim 8, wherein a dimension of the ferromagnetic armature in the pole direction is smaller than the clearance of the air gap.

10. The touch-sensitive input device as recited in claim 1, wherein the ferromagnetic armature is made of a solid material.

11. The touch-sensitive input device as recited in claim 1, wherein,
the ferromagnetic armature is attached at the input part, and
the input part is formed from non-ferromagnetic materials in a region adjoining the ferromagnetic armature.

12. The touch-sensitive input device as recited in claim 1, wherein the deflection direction is substantially parallel to the touch-sensitive input surface.

13. The touch-sensitive input device as recited in claim 1, wherein a dimension of the ferromagnetic armature in the pole direction is $<\frac{1}{10}^{th}$ of a dimension of the ferromagnetic core in the pole direction.

14. The touch-sensitive input device as recited in claim 1, wherein a dimension of the ferromagnetic armature in the pole direction is from 0.9 mm to 1.1 mm.

15. A method of using the touch-sensitive input device as recited in claim 1 in a motor vehicle, the method comprising:
providing the touch-sensitive input device as recited in claim 1;
incorporating the touch-sensitive input device in the motor vehicle; and
using the touch-sensitive input device so as to generate a haptic feedback.

16. The method as recited in claim 15, wherein the touch-sensitive input device is incorporated in a center console of the motor vehicle.

17. A method for controlling a touch-sensitive input device, the method comprising:
providing a touch-sensitive input device comprising:
a support;
an input part comprising a touch-sensitive input surface,
an elastic device configured to bear the input part at the support along a deflection direction so that the input device is elastically reset and is oscillatively movable;
an electromagnetic actuator configured to act between the input part and the support so as to produce a deflection of the input part out of a resting position, the deflection comprising at least one effective direction having an effective direction component that is parallel to the deflection direction, the electromagnetic actuator comprising,
a coil which is configured to define a cavity,
a ferromagnetic core which is arranged at least in a region in the cavity, the ferromagnetic core being configured to generate a magnetic field defining a pole direction, and
a ferromagnetic armature which is configured to interact with the magnetic field and which is arranged outside the cavity, and
control electronics configured to generate an electrical control signal for the ferromagnetic actuator;

charging the coil of the electromagnetic actuator with the electrical control signal generated by the control electronics after a detection of a contact of the input part and/or after a detection of an actuation of the input part by an actuation force sensor, so as to produce the deflection of the input part out of the resting position and to achieve a maximum deflection of the input part, wherein, a duration of the electrical control signal is limited so as to provide, after the deflection, a return of the input part to the resting position or an oscillation of the input part around the resting position along the deflection direction, thereby respectively generating a haptic feedback;

the electrical control signal and the ferromagnetic armature are selected so that, along an imaginary line passing through the ferromagnetic armature in the pole direction, a maximum deflection along a curve of a line is achieved at the latest when a maximum magnetization of the ferromagnetic armature is achieved, and the maximum magnetization is at least 90% of a material-specific saturation magnetization.

18. The method as recited in claim 17, wherein the maximum magnetization is present in >20% of a total volume of the ferromagnetic armature.

19. The method as recited in claim 17, wherein the duration of the electrical control signal does not exceed 5 ms.

20. The method as recited in claim 17, wherein the maximum magnetization of the ferromagnetic armature is achieved in a time interval between first achieving half of the maximum deflection along the curve of the line and between first achieving the maximum deflection along the curve of the line.

* * * * *